United States Patent [19]
Roth et al.

[11] Patent Number: 5,732,342
[45] Date of Patent: Mar. 24, 1998

[54] OPTIMAL RADIO FREQUENCY RECEIVER

[75] Inventors: Sabine Roth, Mönchweiler; Martin Rieger, Rottweil, both of Germany

[73] Assignee: Deutsche Thomson Brandt GmbH, Villingen-Schwenningen, Germany

[21] Appl. No.: 617,875

[22] PCT Filed: Sep. 13, 1994

[86] PCT No.: PCT/EP94/03049

§ 371 Date: Jun. 21, 1996

§ 102(e) Date: Jun. 21, 1996

[87] PCT Pub. No.: WO95/08895

PCT Pub. Date: Mar. 30, 1995

[30] Foreign Application Priority Data

Sep. 22, 1993 [DE] Germany ............... 43 32 161.5

[51] Int. Cl.⁶ .................................................. H04B 1/16
[52] U.S. Cl. ........................ 455/234.1; 455/241.1; 455/245.1; 455/250.1; 348/678
[58] Field of Search ...................... 455/234.1, 234.2, 455/240.1, 241.1, 245.1, 245.2, 246.1, 250.1, 251.1, 253.1, 253.2, 254, 260, 265, 182.1, 182.2, 182.3, 183.1, 183.2, 184.1, 191.1, 192.1, 192.2, 192.3, 196.1; 348/729, 731, 732, 733, 735, 678

[56] References Cited

U.S. PATENT DOCUMENTS

| | | | |
|---|---|---|---|
| 4,355,414 | 10/1982 | Inoue | 455/250.1 |
| 4,709,408 | 11/1987 | Itakura | 455/260 |
| 4,827,511 | 5/1989 | Masuko | 455/241.1 |
| 5,125,106 | 6/1992 | Kato | 348/733 |

FOREIGN PATENT DOCUMENTS

| | | | |
|---|---|---|---|
| 0176703 | 4/1986 | European Pat. Off. | |
| 0302290 | 12/1989 | European Pat. Off. | |
| 0392772 | 10/1990 | European Pat. Off. | |
| 0571790 | 12/1993 | European Pat. Off. | |
| 3346678 | 7/1985 | Germany | |
| 4038110 | 6/1991 | Germany | |
| 406276116 | 9/1994 | Japan | 455/234.1 |
| WO91/17606 | 11/1991 | WIPO | 455/240.1 |

OTHER PUBLICATIONS

IEEE Transactions on Consumer Electronics, vol. 36, No. 3, 30 Aug. 1990, New York US, McGinn M. et al, "An Advanced I.F. Amplifier & AFT System Suitable for HDTV", pp. 407–413.

*Primary Examiner*—Reinhard J. Eisenzopf
*Assistant Examiner*—Thanh Le
*Attorney, Agent, or Firm*—Joseph S. Tripoli; Frederick A. Wein; Peter M. Emanuel

[57] ABSTRACT

A radio-frequency (RF) receiver generally contains an RF amplifier, a mixer stage, a mixer oscillator, a demodulator and an AGC (automatic gain control) circuit, to which the output voltage of the demodulator and a set voltage value for the automatic gain control are applied. Such RF receivers have a non-optimal signal-to-noise ratio under certain circumstances. The present invention improves the signal-to-noise ratio in such high frequency receivers, as well as the effectiveness of the AFT (automatic fine tuning) circuit. The amplitude of the AGC set voltage value is regulated depending on the frequency of the received RF signal so that the mixer stage is optimally controlled at all frequencies of the RF signal. In one embodiment, a PLL circuit connected to the output of the intermediate frequency amplifier to regenerate the non-modulated image carrier, is further used to ensure automatic fine tuning by regulating the frequency of the mixer oscillator.

5 Claims, 1 Drawing Sheet

OPTIMAL RADIO FREQUENCY RECEIVER

BACKGROUND

The invention is based on a radio-frequency receiver. Such radio-frequency receivers are used in particular in television receivers, videorecorders and radio receivers.

In practice, such receivers have an unsatisfactory signal-to-noise ratio in certain circumstances or at specific frequencies of the received RF signal. The invention is based on the object of improving the signal-to-noise ratio in such a radio-frequency receiver. According to a development of the invention, the AFT circuit for automatic sharp tuning by adjusting the mixer oscillator is also improved.

SUMMARY OF THE INVENTION

Conventional circuits operate with a fixed voltage of a desired value for the AGC automatic fading compensation circuit such that the amplitude of the RF voltage at the input of the mixer stage is adjusted to a constant value. The invention is based on the realization that the mixer stage does not have the same properties at all frequencies of the supplied RF signal. Instead, the mixer stage can be modulated to a greater extent at specific frequencies and to a lesser extent at other frequencies. This fact is allowed for by the invention in that the amplitude at the input of the mixer stage is no longer adjusted to a constant value. Instead, the amplitude is adjusted to different values which are dependent on the respective frequency of the RF signal. This takes place in such a way that the mixer stage is always modulated up to the limit, that is to say to a point just before distortions occur in the mixer stage. As a result of this adjustment as far as the modulation limit at all frequencies of the received RF signal, the signal-to-noise ratio is thus increased at least in specific frequency ranges and the image presented is improved with respect to the noise ratio and noise.

The aforesaid development of the invention is based on the following consideration. Circuits are known in which a PLL circuit is connected to the output of the IF amplifier. The PLL circuit produces the unmodulated image carrier from the amplitude-modulated image carrier. The said unmodulated carrier is used in the demodulator for synchronous demodulation or demodulation with addition of the received amplitude-modulated image carrier. The control voltage which is effective within the PLL circuit is dependent here on the frequency of the IF carrier. This control voltage is therefore additionally used for the adjustment of the mixer oscillator with the effect that the IF carrier is at its desired value at the output of the IF amplifier and thus the IF band filter lying between the mixer stage and the IF amplifier is driven to an optimum degree.

BRIEF DESCRIPTION OF THE DRAWINGS

Exemplary embodiments of the invention are explained below with reference to the drawing, in which.

DESCRIPTION OF THE PREFERRED EMBODIMENT(S)

Figure 1:
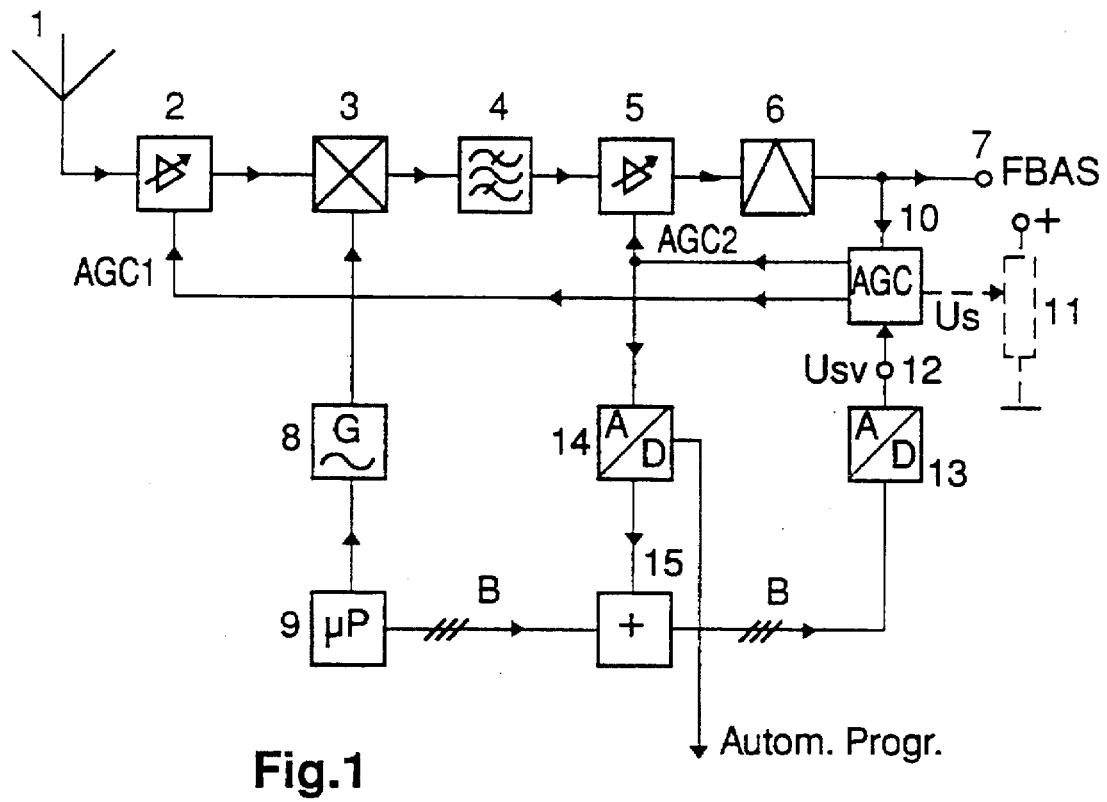
FIG. 1 shows a radio-frequency receiver with the circuit according to the invention and FIG. 2 shows a radio-frequency receiver according to FIG. 1 with an AFT circuit according to the aforesaid development of the invention.

FIG. 1 shows a radio-frequency receiver with the antenna 1, the RF amplifier 2, the mixer stage 3, the IF filter 4, the IF amplifier 5 and the demodulator 6 which supplies the composite colour video signal to the terminal 7. The output of the mixer oscillator 8 is connected to the mixer stage 3. The said mixer oscillator 8 is driven by the microprocessor 9 in order to be tuned to the respectively desired transmitter.

The AGC circuit 10 for automatic fading compensation is connected to the output of the demodulator 6. The said AGC circuit 10 supplies a first control voltage AGC1 for the RF amplifier 2 and a second control voltage AGC2 for the IF amplifier 5. In known circuits, a fixed voltage Us of a desired value is applied by the potentiometer 11 to the AGC circuit 10. This voltage determines at which amplitude of the RF voltage at the input of the mixer stage 3 the control takes place. The RF voltage at the input of the mixer stage 3 is adjusted here to a constant value dependent on the voltage Us of a desired value.

The potentiometer 11 with the permanently set voltage Us of a desired value is now no longer present. Instead, the AGC circuit 10 has an input 12 to which a voltage Usv of a desired value which is dependent on the frequency of the received RF carrier is applied. For this purpose, the microprocessor 9, which controls the tuning and therefore contains the information on the respective frequency of the received RF carrier, supplies via the bus B a digital voltage which indicates the frequency of the received RF carrier. The said voltage is fed to the input of the digital-analog converter 13. At its output, the latter now supplies to the input 12 a variable voltage Usv of a desired value which is dependent on the frequency of the received RF carrier. The dependence of Usv on the frequency of the RF carrier received with the antenna 1 is such that the mixer stage 3 is completely modulated at all reception frequencies. The respective interrelation between Usv and the reception frequency is preferably identified empirically.

The control voltage AGC2 for the control of the amplification of the IF amplifier 5 is additionally applied to the input of the analog-digital converter 14, which produces a digital signal which represents the control voltage AGC2. In the adder stage 15, this signal is added to the digital signal from the microprocessor 9. In this way, an additional adaptation of Usv, and thus of the automatic fading compensation, to the respective signal strength is achieved. The analog-digital converter 14 can additionally supply a digital signal for an automatic programming of the receiver. Such automatic programming requires a signal for the respective level of the received transmitter so that only the transmitters whose level is high enough are programmed. This signal can thus be supplied from the respective value of the control voltage AGC2 via the analog-digital converter 14.

Figure 2:
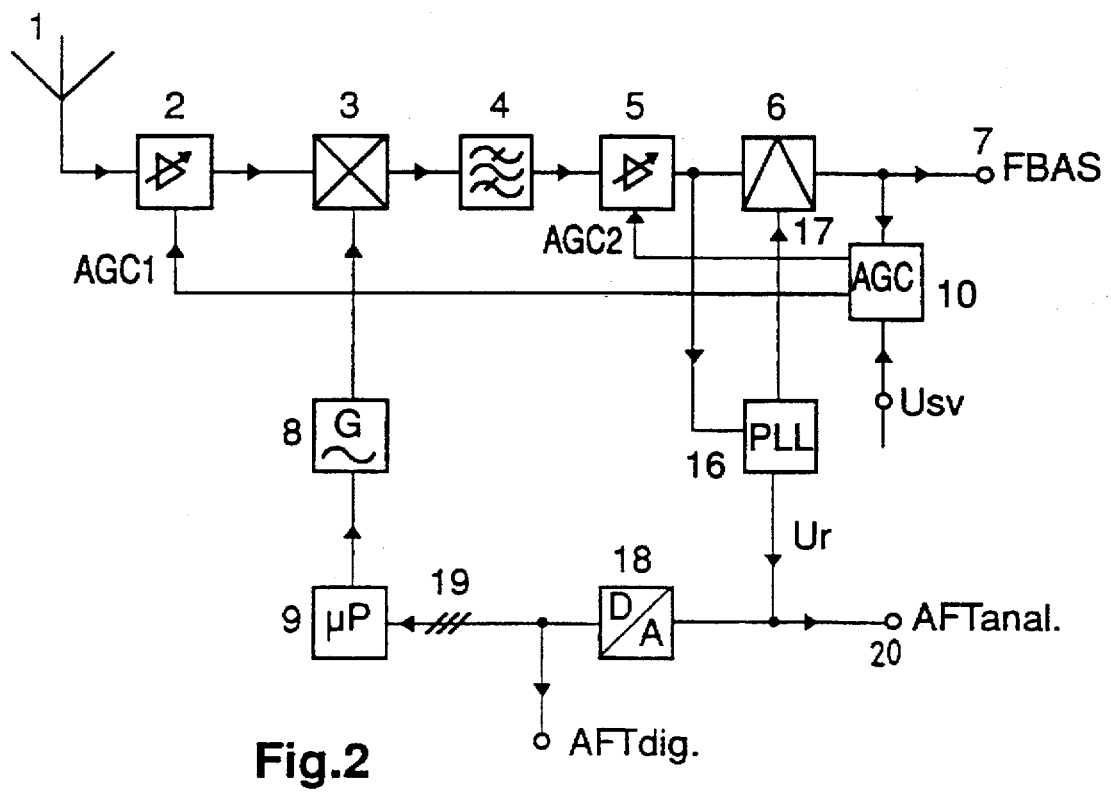

FIG. 2 shows a circuit according to FIG. 1 with the following supplement. The PLL circuit 16 is connected to the output of the IF amplifier 5. The circuit 16 produces the unmodulated image carrier from the IF carrier, which is amplitude-modulated with the luminescence signal, which unmodulated image carrier is fed via the line 17 to the demodulator 6 for a synchronous demodulation or so-called demodulation with carrier addition. Such a method of demodulation permits a smaller number of distortions of the acquired luminescence signal. Within the PLL circuit 16 a control voltage Ur which is dependent on the frequency of the IF carrier is effective. This control voltage is now additionally fed to the analog-digital converter. The latter supplies a digital signal, which represents the respective frequency or frequency deviation, to the microprocessor 9 via the bus 19. In this way, automatic retuning of the mixer oscillator 8 takes place with the effect that the IF carrier has its desired frequency at the output of the mixer stage 3 and the IF filter 4 is correctly modulated. A digital AFT voltage can be picked off from the output of the analog-digital converter 18. Furthermore, the output of the PLL circuit 16 supplies an analog AFT control voltage at the terminal 20, which analog AFT control voltage can, if appropriate, be fed to a mixer oscillator for retuning.

What is claimed is:

1. A radio-frequency receiver having an RF amplifier, a mixer stage, a mixer oscillator, a demodulator comprising:

an AGC automatic fading compensation circuit to which an output voltage of the demodulator and a voltage of a predetermined value are applied, and which provides control voltages for the RF amplifier and an IF amplifier, the amplitude of the voltage of predetermined value being controllable as a function of the frequency of the received RF signal so that the mixer stage is modulated at optimum at all frequencies of the RF signal, the AGC control voltage for the IF amplifier being applied to an input of an analog-digital converter whose digital output voltage is added to a digital voltage coupled to a digital-analog converter from a microprocessor.

2. Receiver according to claim 1 wherein a PLL circuit for regenerating the unmodulated image carrier for a synchronous demodulation of the received modulated image carrier is coupled to an output of the IF amplifier.

3. Receiver according to claim 2, wherein a control voltage of the PLL circuit is modulated for an AFT retuning of the mixer oscillator.

4. Receiver according to claim 3, wherein an output of the PLL circuit whose voltage indicates the frequency deviation of the IF carrier from the desired value is connected via an analog-digital converter to an input microprocessor which controls the mixer oscillator for the AFT retuning.

5. A radio-frequency receiver having an RF amplifier, a mixer stage, a mixer oscillator, a demodulator comprising:

an AGC automatic fading compensation circuit to which an output voltage of the demodulator and a voltage of a predetermined value are applied, and which provides control voltages for the RF amplifier and an IF amplifier, the amplitude of the voltage of predetermined value being controllable as a function of the frequency of the received RF signal so that the mixer stage is modulated at optimum at all frequencies of the RF signal, the AGC control voltage for the IF amplifier being applied to an input of an analog-digital converter whose digital output voltage is added to a digital voltage coupled to a digital-analog converter by a microprocessor, the output of the analog-digital converter being additionally coupled to a circuit for automatic programming with station finding.

* * * * *